(12) United States Patent
Hedrick

(10) Patent No.: US 6,584,839 B1
(45) Date of Patent: Jul. 1, 2003

(54) MODULAR ALTIMETER

(75) Inventor: Geoffrey S. M. Hedrick, Malvern, PA (US)

(73) Assignee: Innovative Solutions and Support Inc., Malvern, PA (US)

( * ) Notice: Subject to any disclaimer, the term of this patent is extended or adjusted under 35 U.S.C. 154(b) by 0 days.

(21) Appl. No.: 09/798,228

(22) Filed: Mar. 2, 2001

Related U.S. Application Data

(63) Continuation-in-part of application No. 09/798,229, filed on Mar. 2, 2001.

(51) Int. Cl.$^7$ .................................................. G01L 7/20
(52) U.S. Cl. ........................... 73/384; 702/144; 702/138
(58) Field of Search ........................... 73/384, 386, 367, 73/701, 244, 179; 702/144, 138–140, 85, 98, 104

(56) References Cited

U.S. PATENT DOCUMENTS

| | | | | | |
|---|---|---|---|---|---|
| 5,349,347 | A | * | 9/1994 | Muller | 340/969 |
| 5,458,432 | A | * | 10/1995 | Teschner, III et al. | 403/374 |
| 6,266,583 | B1 | * | 7/2001 | Tazartes et al. | 701/4 |
| 6,285,926 | B1 | * | 9/2001 | Weiler et al. | 701/4 |
| 6,462,703 | B2 | * | 10/2002 | Hedrick | 342/120 |

* cited by examiner

Primary Examiner—Hezron Williams
Assistant Examiner—Jermaine Jenkins
(74) Attorney, Agent, or Firm—Cohen, Pontani, Lieberman & Pavane

(57) ABSTRACT

An altimeter which contains within it means for storing the Static Source Error Correction (SSEC) for the aircraft. The altimeter includes means for downloading the SSEC and for transferring it to a new altimeter which may then be used in place of the original altimeter without losing the information built up over time or having to re-calibrate the new altimeter based on new tests. The altimeter also includes means for uploading a known SSEC thereto.

8 Claims, 3 Drawing Sheets

MODULAR ALTIMETER

CROSS-REFERENCE TO RELATED APPLICATION

This application is a continuation-in-part of my co-pending application, Ser. No. 09/798,229, filed Mar. 2, 2001, the disclosure of which is hereby incorporated by reference.

BACKGROUND OF THE INVENTION

1. Field of the Invention

This invention relates to the field of avionics, and, more particularly, to altimeters which may be readily exchanged without the need for in-flight recalibration.

2. Description of the Related Art

One of the most important pieces of aviation equipment is the altimeter, which calculates and displays the altitude of the aircraft. Current international aviation rules provide a preference to aircraft which are capable of determining their altitude within a predetermined accuracy, so there is a premium on precise measuring of actual altitude.

The basic method of determining altitude while an aircraft is in flight is by measuring the static air pressure on the exterior of the aircraft, and then calculating the altitude as a measure of height above sea level. Altitude measurement based on raw pressure data is not, however, a truly precise calculation.

That initial measurement is affected by many sources of static source error, including pressure measurement and conversion errors, line errors (leaks, etc.), barometric-correction errors, and others. Some sources of error (such as line errors) may be minimized (but not completely eliminated) by careful manufacturing procedures and quality assurance in aircraft manufacture. Other sources of error, such as pressure variations due to aircraft geometry (e.g., fit of doors near static ports, shape of static port, placement of static ports) are essentially constant over time, and may be factored out of pressure calculations to some degree by establishing a static source error correction ("SSEC"). These latter types of error are collectively referred to as "static source error" and may be derived from flight calibration measurements.

Static source error for a group of aircraft may be similar but will vary among individual aircraft. Each aircraft, therefore, has its own unique SSEC which is typically represented by a series of curves representing the SSEC for an individual aircraft and each altimeter, if more than one altimeter is used, at each of a range of aircraft flight speeds.

It is well-known in the art to provide SSEC, and the necessary calculation and monitoring of an aircraft's SSEC have been incorporated in aviation regulations that have been in place for decades.

However, altimeters are mechanical devices that must periodically be replaced, and the replacement altimeters require recalibration when installed, because known altimeters do not have the ability to recall the SSEC used with a prior altimeter. This means that each installation of a new altimeter requires re-calibration, a process that is costly and time-consuming. In some applications, such as where the aircraft uses a redundant altimeter system such as described in my referenced co-pending application, some altimeters may have their SSEC stored in on-board flight computers, so that replacement of the altimeters is a simple matter. However, not all aircraft are so equipped, and even in aircraft with two redundant altimeters, having independent flight computers, systems which utilize the third backup altimeter disclosed in my referenced application do not have three flight computers for storing the SSEC of the backup altimeter.

There is accordingly a need in the art for an altimeter that does not require re-calculation of an aircraft's SSEC each time that it is replaced. It would also be useful if such an altimeter could be employed within a redundant altimeter system such as described in my prior referenced application.

SUMMARY OF THE INVENTION

It is therefore an object of the present invention to provide an altimeter that retains the SSEC for an aircraft and is operable to pass on the SSEC to a new altimeter when the original is replaced.

In accordance with the invention, the inventive altimeter contains within it a means for storing the Static Source Error Correction (SSEC) for the altimeter. The altimeter also includes means for downloading the SSEC and for transferring it to a new altimeter which may then be used in place of the original without loss of the information built up over time or requiring re-calibration of the new altimeter based on newly performed tests, as well as means for uploading the SSEC from another altimeter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE CURRENTLY PREFERRED EMBODIMENTS

Figure 1:
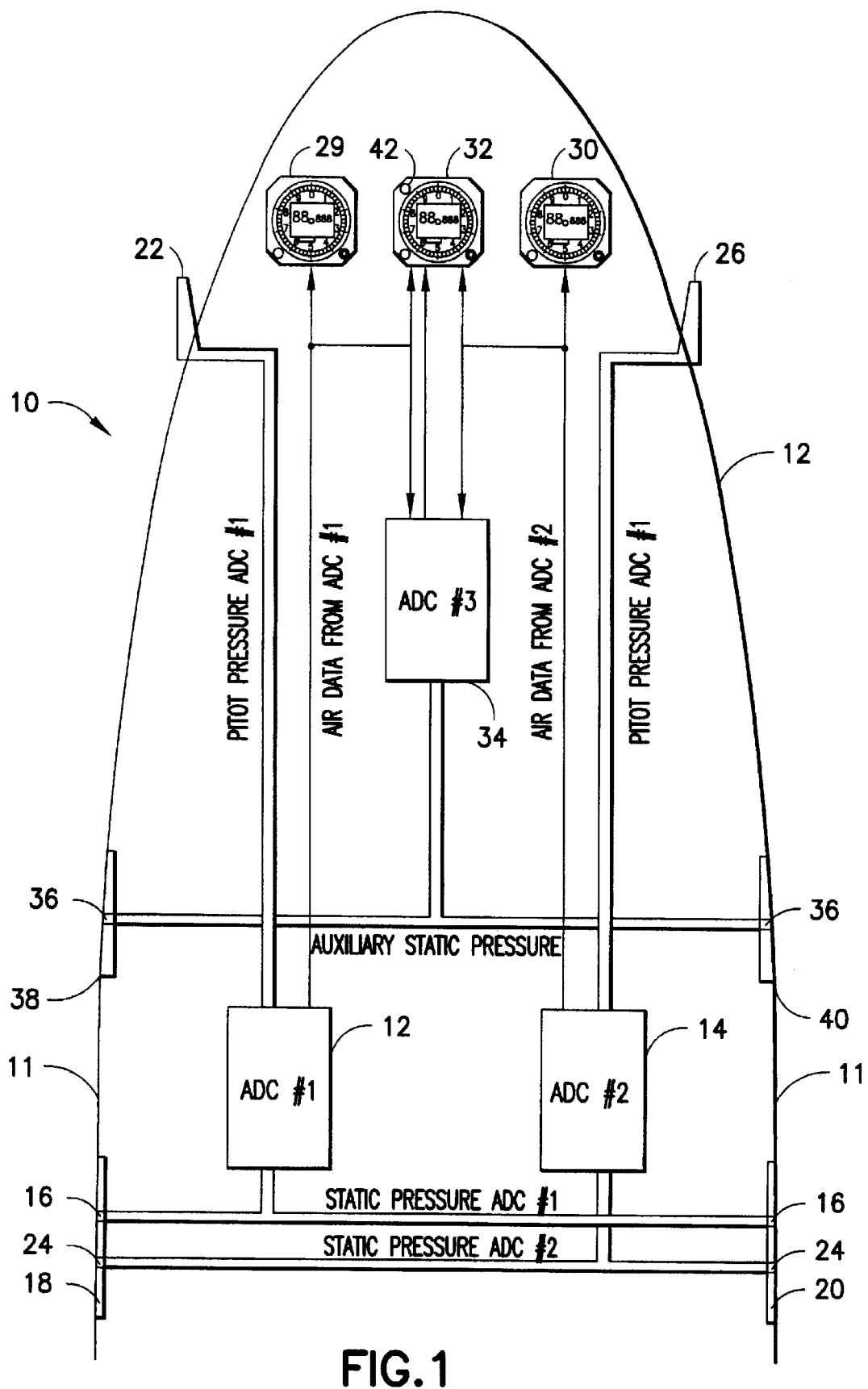
FIG. 1 is a block diagram of a self-correcting backup altimeter system in accordance with the present invention installed in an aircraft meeting RVSM altitude-measurement requirements.

FIG. 1 depicts the relevant systems of an aircraft 10 having a redundant pair of primary altimeter systems to meet the mandated requirements of RVSM operation. Thus, aircraft 10 includes a first air data computer (ADC) 12 and a second ADC 14 to comply with RVSM regulations. First and second ADCs 12, 14 independently gather and compute information utilized by the aircraft and crew during flight and, as is most preferred, may utilize or operate on different operating systems, hardware and other components to ensure their independence and avoid any possibility of dual system failures resulting from common implementation.

First ADC 12 receives information or data relating to the static pressure on the exterior of aircraft 10 from first static pressure ports 16 located in areas 18, 20 of aircraft skin 11. Aircraft skin 11 is manufactured in areas 18, 20 to strict tolerances and is maintained to exacting specifications as required by RVSM regulations. First ADC 12 also receives pitot pressure information from a first pitot pressure port 22 that is located on or adjacent skin 11 at a position removed from areas 18, 20.

Second ADC 14 similarly receives static pressure information from second static pressure ports 24, that are likewise located in areas 18, 20, of the skin 11, and also receives pitot pressure information from a second pitot pressure port 26 remote from areas 18, 20 and port 22.

In operation, first ADC 12 processes the information received from all relevant sources, indicating static pressure ports 16, and generates a signal indicative of the calculated corrected altitude to a first (pilot) altimeter 28 in known fashion. Similarly, second ADC 14 receives static pressure information from second static pressure ports 24 and generates a signal indicative of the independently calculated and corrected altitude of aircraft 10 to a second (co-pilot) altimeter 30. The flight crew is thus able to compare altimeters 28, 30 which should closely agree to ensure that aircraft 10 is operating within the mandated parameters for RVSM operation. This is all conventional.

In accordance with the invention, aircraft 10 is also provided with a third, backup altimeter 32 that receives and displays calculated altitude indication data that is output by a third ADC 34. Although the unit 34 is denoted herein and depicted in FIG. 1 as an air data computer, and may in fact operationally duplicate all of the capabilities and functionality of the primary ADCs 12, 14, significantly less functionality is required of the unit 34 by the improvement of the present invention. Accordingly, ADC 34 may instead be implemented by any controller suitably constructed, configured and interconnected to the other components and devices of the aircraft 10 for performing the operations and functions described herein and otherwise for providing a self-calibrating backup altitude indication on backup altimeter 32. Moreover, while it is generally intended and contemplated that ADC or controller 34 will be microprocessor based, any other implementation based on custom ASICs (Application Specific Integrated Circuits) or other combinations of conventional integrated circuits and/or discrete electronic components and the like may alternatively be employed in unit 34. For convenience and ease of description, and with the foregoing in mind, the unit 34 is nevertheless referred to herein as an ADC.

Auxiliary ADC 34 is in any event independent of the primary ADCs 12, 14 and receives ambient (i.e. exterior to the aircraft skin) static pressure information from one or more independent auxiliary static pressure ports 36 which are located on aircraft skin 11 at locations 38, 40 remote from areas 18, 20. Advantageously, skin 11 at locations 38, 40 is not manufactured or configured or contoured, and need not be maintained, to the exacting geometries and tolerances required for RVSM operation in the manner of areas 18, 20. Thus, the exact geometry of the aircraft skin at areas 38, 40, and/or the characteristics of ports 36, are not initially known (nor necessarily consistent from sample to sample of a particular aircraft model) with RVSM-required precision. As a result, the SSEC values for auxiliary static ports 36 are not known or readily determinable, absent costly and extensive testing and in-flight calibration procedures (that are unnecessary in accordance with the present invention) for each as-built aircraft 10. Instead, when the aircraft is manufactured, or upon initial installation of the backup altimeter system of the invention, or after maintenance activities relating to or otherwise affecting auxiliary static ports 36 or the airframe skin in the vicinity of auxiliary static port areas 38, 40, an "approximate" or "estimated" initial SSEC—based, by way of example, on values developed during flight testing of a prototype of aircraft 10—is utilized by ADC 34 to calculate the altitude for display on backup altimeter 32. At initial delivery of the aircraft or after certain aircraft maintenance operations, therefore, the backup altimeter 32 cannot be immediately used for RVSM operations until it has thereafter undergone self-calibration to RVSM accuracy in accordance with the invention during a sufficient period of normal flight of the aircraft. After initial calibration, backup altimeter 32 will store its SSEC as will be described presently.

The self-calibration of the inventive backup altimeter system is carried out continuously whenever the aircraft is in flight. In short, auxiliary ADC 34 dynamically compares the current altitude determinations output by primary ADCs 12, 14 for display on the primary altimeters 28, 30 with the altitude determination made by auxiliary ADC 34 using, at the outset, its initial SSEC and, as time progresses, a modified or corrected SSEC. Auxiliary ADC 34 utilizes a learning algorithm or process for dynamically correcting the SSEC so that, over time, the altitude determinations output by auxiliary ADC 34 become as accurate as those output by the primary ADCs 12, 14.

Figure 2:
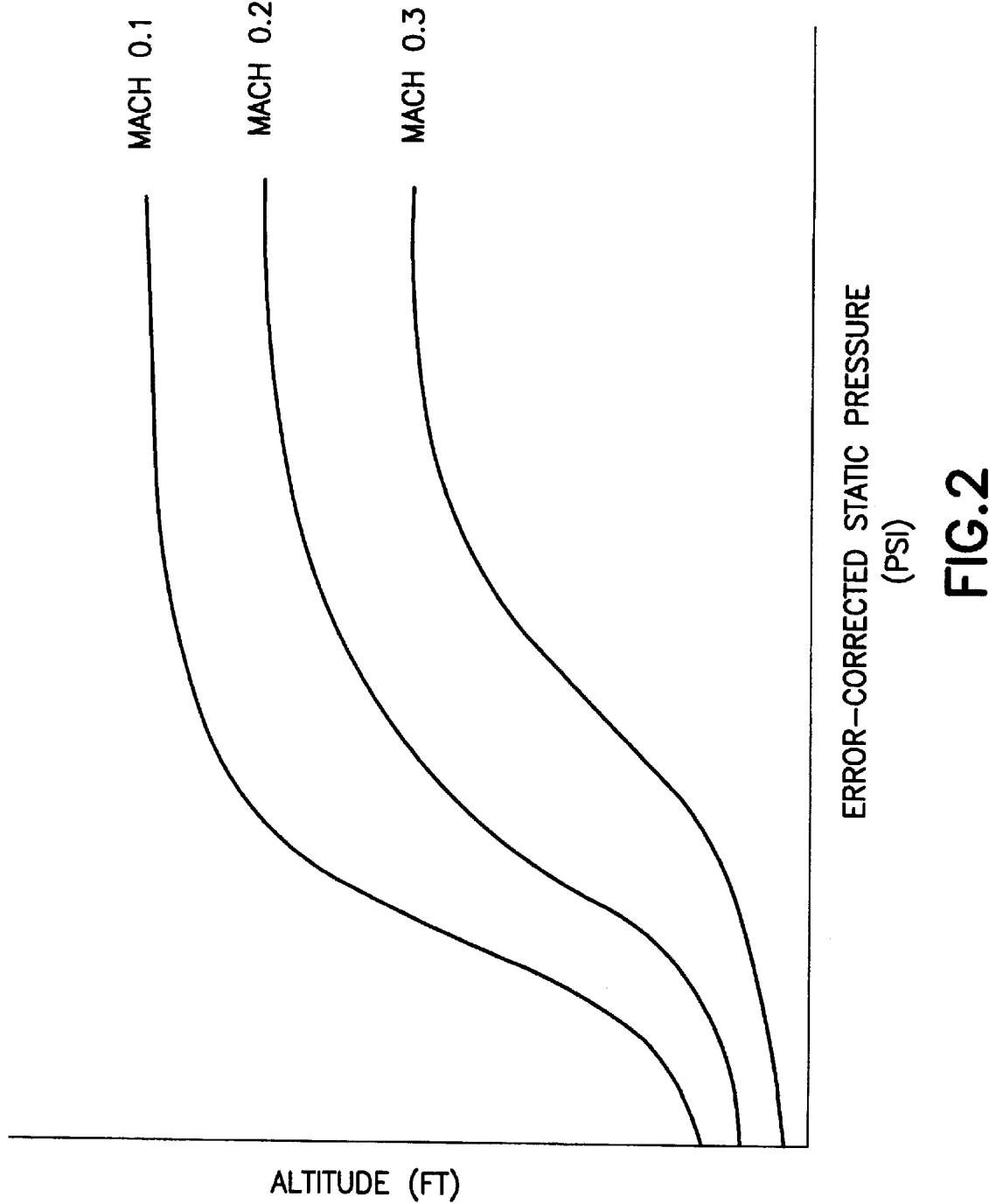
FIG. 2 graphically depicts by way of example a set of dynamically-developed, error-corrected altitude measurement SSEC curves.

Auxiliary ADC 34 thus receives pressure information or data from auxiliary static ports 36 for use in calculating current altitude, using an SSEC stored for backup altimeter 32 and which is independent of the SSECs of primary ADCs 12, 14. As previously noted, at the time of initial operation after manufacture, backup altimeter 32 has an "approximate" or "estimated" initial SSEC value based upon estimated SSEC for its type of aircraft, but that initial SSEC is not intended or expected to yield an altitude determination calibrated or accurate to a degree sufficient to support RVSM operations. Altimeter 32 provides that initial SSEC to auxiliary ADC 34. Auxiliary ADC 34 also receives as inputs certain signals from primary ADCs 12, 14 which relate to the altitude determinations calculated by ADCs 12, 14. The calculated altitudes output by primary ADCs 12, 14 have of course been carefully and reliably calibrated to an accuracy sufficient for certified RVSM operations and, so long as the altitude outputs of the primary ADCs 12, 14 remain in agreement, auxiliary ADC 34 can reasonably operate under the assumption that those determinations are sufficiently error free to support RVSM operation of the aircraft. Auxiliary ADC 34 accordingly continuously compares its current calculated altitude determination with the current altitude determinations of primary ADCs 12, 14 and applies a suitable correction to its stored SSEC toward achieving a corresponding altitude determination based on its own independently carried out calculations. Since SSEC values vary with airspeed (e.g. Mach number), auxiliary ADC 34 additionally receives—for example from primary ADCs 12, 14—current airspeed data for use in developing calibrated SSEC curves such as those depicted in FIG. 2, and may also receive additional data relating to aircraft performance and/or flight parameters as will be apparent to those skilled in the relevant art.

It should be noted that although the dynamic comparison of the current altitude as calculated by auxiliary ADC 34 with the calculated altitude determinations of the primary ADCs 12, 14, and the ensuing corrections of the SSEC of the auxiliary ADC 34, is described herein as being continuously performed, the comparison and correction may in practice be carried out repeatedly at predetermined intervals deemed suitable to result in reasonably rapid determination of accurate SSEC curves for the aircraft. The interval between subsequent repetitions of the comparison and SSEC corrections may, in addition, be varied as a function of aircraft flight parameters or otherwise as general matters of design and engineering choice.

The learning algorithm employed by auxiliary ADC 34 for continuously (or repeatedly) correcting and updating and refining the SSEC values and curves is preferably a recursive algorithm that gradually "seeks", as a function of time, high precision SSEC values that can be relied upon for aircraft operations in RVSM airspace. Most preferably, the learning algorithm is implemented by a conventional Kalman filter, which is a well-known statistical construct that is useful in predicting, over time, the states of a system based upon measurements of a variable and a comparison of initial predictions with the actual value of a given state. In this instance, the Kalman filter provides a methodology for determining, with increasing accuracy with the progression of time, the actual altitude of an aircraft 10 based upon pressure data from auxiliary static ports 36 and comparison of the auxiliary ADC's altitude determination with the calibrated altitude determinations output to the primary altimeters 28, 30.

In this manner the self-calibration of backup altimeter 32, to an accuracy sufficient to support RVSM operations, can be effected relatively quickly during a single flight of the aircraft so that, in the event that one of the primary altimeters 28, 30 fails in the course of that flight, backup altimeter 32 can take over for the failed primary altimeter to thereby permit the aircraft to remain in RVSM airspace. Of course the longer that the aircraft flies, and the more flights at varying altitudes and airspeeds that it takes, the more refined and accurate will be the SSEM curves that are generated for the auxiliary ADC 34 and backup altimeter 32—although, as will be appreciated, the calculated SSEM curves will relatively quickly attain steady state values that are unlikely to appreciably change absent changes to the contours or physical characteristics or geometries of the auxiliary static ports 36 or the aircraft skin 11 in the areas 38, 40, whether as a result of intentional modifications or maintenance by ground or aircraft personnel or due to an in-flight incident that unexpectedly changes the characteristics of the ports or skin areas or the like. Indeed, any such change—whether on the ground or during flight—will be immediately apparent as the continuously operating learning algorithm of the auxiliary ADC 34 dynamically identifies differences between the altitude determinations output by the primary ADCs 12, 14 (or, where one of the primary ADCs has failed, by the remaining "good" primary ADC) and the independent altitude determination by auxiliary ADC 34.

Auxiliary altimeter 32 can be provided with an associated lamp 42 or other indicator, on or adjacent its faceplate, that is illuminatable or otherwise operable to indicate to the flight crew that the SSEM curves of auxiliary ADC 34 have stabilized (i.e. that their values have reached a state of equilibrium) so that, based additionally on the comparatively-confirmed accuracy of the altitude indications on backup altimeter 32, the backup altimeter has been suitably and sufficiently calibrated to support its use in RVSM operations. Any subsequent change in a characteristic of the auxiliary ports 36 or of the aircraft skin in the areas 38, 40—which will immediately result in detected differences as between the altitude determinations of the auxiliary ADC 34 and the primary ADC(s) 12, 14—will cause the indicator 42 to be extinguished and/or activation of another indication or alarm to so alert the flight crew of continued, ongoing adjustments of the auxiliary ADC SSEM.

Thus, the static air pressure measurements or data from auxiliary static pressure ports 36 are relayed to auxiliary ADC 34 which uses that data to estimate the altitude to be shown on auxiliary altimeter 32. Auxiliary ADC 34 is initially provided with an estimated SSEC or SSEC curves for use in its initial, uncalibrated determinations of altitude using the data from auxiliary ports 36. When the aircraft is in flight, auxiliary ADC continually compares its current calculated estimate of altitude with the calibrated altitude determinations from primary ADCs 12, 14 and, using a Kalman filter algorithm (or other learning or suitable compensation algorithm), recursively or otherwise continuously adjusts and modifies the SSEC values that it is using to calculate and correct the resulting altitude estimate. This process continues, even after the SSEM values have stabilized and the altitude determinations by auxiliary ADC 34 agree precisely with those from primary ADCs 12, 14, thereby providing dynamic steady-state monitoring of and, if needed, corrections to the SSEC. The backup altimeter 32, as driven by auxiliary ADC 34, is therefore continuously self-calibrating during flight for permissible use in RVSM airspace should one of the primary altimeters 28, 30 fail.

The present invention accordingly provides significant cost savings, both in initial hardware and installation costs and in subsequent maintenance costs, as contrasted with the installation of a third (backup) pre-calibrated altimeter system such as those of primary altimeters 28, 30. The auxiliary static ports 36, and the aircraft skin 11 in the area of the ports 36, need not be contoured or otherwise configured to precisely known geometries and so maintained during the operating life of the aircraft. The backup altimeter unit 32 itself, since it is intended for emergency rather than regular or long-term use to support flight in RVSM airspace, need not necessarily be of same level of precision, and therefore as costly to the aircraft manufacturer, as the primary altimeters 38, 30. In addition, no time-consuming and expensive pre-certification procedures for RVSM operations need be carried out for the backup altimeter system of the invention. Finally, during every flight of the aircraft the inventive backup altimeter system continuously and dynamically operates in a self-calibrating mode that assures that, should it be needed to support continued RVSM operations in, for example, the event of a failure of one of the primary altimeter systems, the backup altimeter will be precisely calibrated and ready to assume that functionality and task.

As will also be apparent, the hardware and operating functions of auxiliary ADC or controller 34 may be incorporated directly in the housing of backup altimeter 32 to provide a compact and self-contained device that may be readily installed and incorporated in newly-manufactured aircraft or added to existing aircraft.

Figure 3:
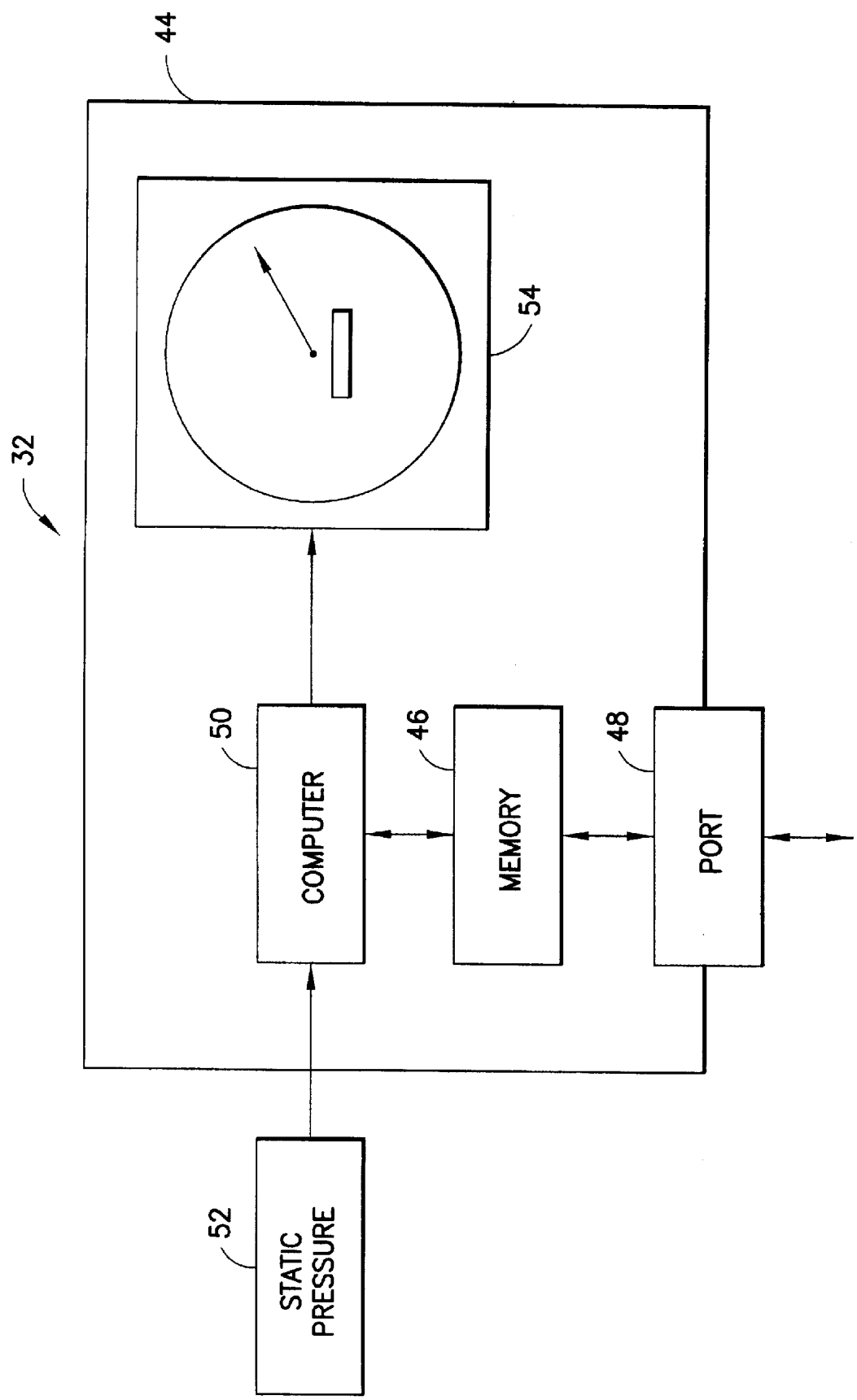
FIG. 3 is a schematic diagram of a preferred embodiment of the inventive backup altimeter.

FIG. 3 depicts the components of altimeter 32 for use in an aircraft in accordance with the invention, omitting standard components for known altimeters for convenience of illustration.

Altimeter 32 includes a housing 44, a memory 46, such as an EPROM (Electrically Programmable Read-Only Memory), in which the SSEC for the aircraft is stored, and a port 48 through which the SSEC may be downloaded from memory 46 to a device (not shown) exterior to altimeter 32, such as a replacement altimeter or a database for storing altimeter SSECs, or uploaded into memory 46, depending upon whether altimeter 32 is being replaced or is itself replacing another altimeter.

A means operable for calculating the altitude of the aircraft, such as a microprocessor or computer 50, receives data relating to the current static air pressure outside of the aircraft from a source 52, and also receives the stored SSEC from memory 46. Computer 50 uses the data and the stored SSEC to calculate, in known fashion, the actual altitude of the aircraft and causes it to be displayed on a visible display 54 of altimeter 32.

Computer 50 may be located either within housing 44 of altimeter 32, as shown in FIG. 3, or separately exterior of housing 44 as a general matter of design choice for the person of ordinary skill in the art. In the preferred embodiment, computer 50 is located integrally within housing 44, and memory 46 forms a part of computer 50.

In practice, the SSEC for altimeter 32 may be obtained in any of several ways. Most easily, if altimeter 32 is a replacement altimeter, the SSEC may be downloaded from the old altimeter and then uploaded to altimeter 32 through port 48.

Alternatively, if altimeter 32 is the original altimeter, or if the SSEC has been lost, the SSEC must be calculated before altimeter 32 may reliably display the altitude. In this case, the SSEC may be determined in the manner described hereinabove and in my referenced co-pending application, the disclosure of which has been incorporated by reference.

The retrieval of the SSEC from memory 46 may be accomplished in any desired fashion such, for example, as by reading the EPROM, or by physically removing the memory and placing it into the new altimeter. This is a matter of design choice for one of ordinary skill in the art.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An altimeter for use in an aircraft, comprising:

a housing;

means for receiving static air pressure data relating to the air pressure outside the aircraft;

means for receiving a static source error correction;

means coupled to said means for receiving a static source error correction for storing the received static source error correction within said housing;

means coupled to said means for receiving said static air pressure data and to said storing means for calculating an altitude as a function of said received static air pressure data and said received static source error correction; and means coupled to said calculating means for displaying the calculated altitude.

2. The altimeter of claim 1, wherein said means for storing is an EPROM.

3. The altimeter of claim 1, wherein said altimeter further includes means for downloading said static source error correction from said altimeter.

4. The altimeter of claim 3, wherein said means for downloading is operable to download said static source error correction from said altimeter to an exterior means separate from said altimeter for storing said static source error correction when said altimeter is removed from the aircraft.

5. The altimeter of claim 1, wherein said means for storing is removable from the altimeter.

6. An altimeter for use in an aircraft, comprising:

a housing;

means for receiving static air pressure data relating to the air pressure outside the aircraft;

means for receiving a static source error correction;

means in said housing and coupled to said means for receiving a static source error correction for storing the received static source error correction;

means coupled to said means for receiving said air pressure data and to said storing means for calculating an altitude as a function of said static air pressure data and said static source error correction;

means for downloading said static source error correction from said altimeter to an exterior means separate from said altimeter for storing said static source error correction when said altimeter is removed from the aircraft; and means coupled to said calculating means for displaying the calculated altitude.

7. The altimeter of claim 6, wherein said means for storing is an EEPROM.

8. The altimeter of claim 6, wherein said means for storing is removable from the altimeter.

* * * * *

(12) EX PARTE REEXAMINATION CERTIFICATE (7326th)
United States Patent
Hedrick

(10) Number: US 6,584,839 C1
(45) Certificate Issued: Jan. 19, 2010

(54) MODULAR ALTIMETER

(75) Inventor: Geoffrey S. M. Hedrick, Malvern, PA (US)

(73) Assignee: Innovative Solutions and Support Inc., Malvern, PA (US)

Reexamination Request:
No. 90/008,729, Jun. 25, 2007

Reexamination Certificate for:
Patent No.: 6,584,839
Issued: Jul. 1, 2003
Appl. No.: 09/798,228
Filed: Mar. 2, 2001

Related U.S. Application Data

(63) Continuation-in-part of application No. 09/798,229, filed on Mar. 2, 2001, now Pat. No. 6,626,024.

(51) Int. Cl.
    *G01C 5/00* (2006.01)

(52) U.S. Cl. .............. 73/384; 702/138; 702/144
(58) Field of Classification Search .......... None
    See application file for complete search history.

(56) References Cited

PUBLICATIONS

ADS–80 Air Data System instruction book Jun. 22, 1999.
ADS–87A Air Data System Product Catalog.
Collins ADS–80()/82()/85() Air Data System pilots' guide Oct. 4, 1989.
ADS–85/86 Air Data System Product Catalog.
Letter re: Declassification of Feb. 22, 2007 30(b)6 deposition of Donald Furmanski and exhibits of Ametek in IS&S v J3 et al., U.S.D.C. W.D. Tenn., 05–2665–MI P, Sep. 19, 2007.
Functional Requirements for the Citation Jet AM–250 Barometric Altimeter (BA), 70251FRQ, Rev. C, Jan. 5, 2000.
Plan for Software Aspects of Certification for the Citation Jet AM–250 Barometric Altimeter (BA), 70251SCP, Rev. D, Nov. 1, 1999.
Outline, Barometric Altimeter, Dwg. No. 70251, Rev. K, Oct. 15, 1999, Sheets 1–2.

*Primary Examiner*—Anjan K. Deb

(57) ABSTRACT

An altimeter which contains within it means for storing the Static Source Error Correction (SSEC) for the aircraft. The altimeter includes means for downloading the SSEC and for transferring it to a new altimeter which may then be used in place of the original altimeter without losing the information built up over time or having to re-calibrate the new altimeter based on new tests. The altimeter also includes means for uploading a known SSEC thereto.

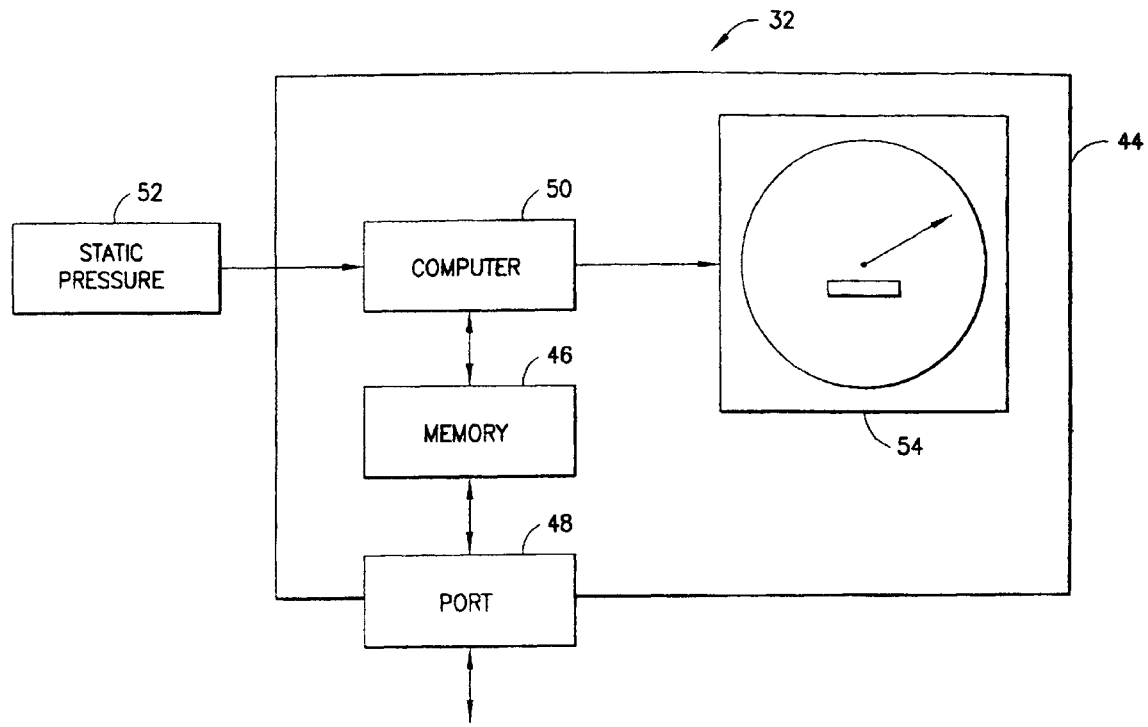

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 5 is confirmed.

Claim 1 is cancelled.

New claims 9–11 are added and determined to be patentable.

Claims 2–4, 6–8 were not reexamined.

*9. An altimeter for use in an individual aircraft, comprising:*
  *a housing;*
  *means for receiving static air pressure data relating to the air pressure outside the aircraft;*
  *means for receiving a static source error correction, wherein the static source error correction is unique for the individual aircraft;*
  *means coupled to said means for receiving a static source error correction for storing the received static source error correction within said housing;*
  *means coupled to said means for receiving said static air pressure data and to said storing means for calculating an altitude as a function of said received static air pressure data and said received static source error correction; and*
  *means coupled to said calculating means for displaying the calculated altitude.*

*10. The altimeter of claim 9, wherein said means for receiving comprises means for uploading the static source error correction from an exterior means separate from said altimeter.*

*11. The altimeter of claim 9, wherein said means for storing is removable from the altimeter.*

* * * * *